INVENTOR
JOHN W. SMITH AND
ALBERT H. LIBBEY
BY
Edward T. Connors
ATTORNEY

United States Patent Office 3,530,385
Patented Sept. 22, 1970

3,530,385
STABILIZATION CIRCUIT FOR THE MEAN LEVEL OF A THREE LEVEL WAVEFORM

John W. Smith, Whitestone, N.Y., and Albert H. Libbey, Hampton, N.H., assignors to Graphic Transmission Systems, Inc., East Hanover, N.J.

Filed Apr. 29, 1969, Ser. No. 820,264
Int. Cl. H03k 5/20
U.S. Cl. 328—116 4 Claims

ABSTRACT OF THE DISCLOSURE

A stabilization circuit is shown including a pair of peak level detectors connected to a voltage divider to provide a waveform representative of variations in the mean level of the three level waveform. Circuit means including an operational amplifier is shown for inverting the variation in mean level waveform and for combining the inverted waveform with the three level waveform to provide a three level waveform having a stabilized mean level.

The present invention relates to bandwidth reduction systems for transmission of the information from an analogue signal over a communications-channel of limited bandwidth in which a three level signal is used, and more particularly to means for stabilizing the mean level of this signal.

A bandwidth reduction system has been described and claimed in patent application Ser. No. 765,579 filed Oct. 7, 1968 by John W. Smith, one of the inventors herein and titled Bandwidth Reduction System. In such a bandwidth reduction system the input signal may be an analogue signal of any type such as an unmodified facsimile signal. Without bandwidth reduction about six minutes are required to transmit a facsimile signal for a standard sized letter page over a conventional telephone circuit. When bandwidth reduction is provided the transmission may be reduced to three minutes. Prior to the disclosure of said Smith patent application bandwidth reduction systems have been provided wherein analogue signals have been converted to binary signals which have then been converted into multilevel signals. These signals have been used to modulate carriers for transmission over telephone circuits.

Many of the prior systems have used clock timing means to produce binary signals with equally spaced pulses. In such systems clock timing has been required at both the transmitter and receiver to synchronize the apparatus. The Smith application provides a bandwidth reduction system which does not employ clock timing to produce equally spaced pulses in the binary signal.

It is known to produce the binary pulses from analogue pulses of the facsimile signal, and to utilize changes in density of the copy to produce changes in signal levels of the pulses of the analogue signals, these changes of signal level being used to produce the binary pulses.

In both the prior art systems and in the system in accordance with the present invention three level signals are used to transmit the signals over the transmission lines. All of such three level signals are subject to an inherent fluctuation or variations of the mean level thereof by reason of variations in the transmission medium.

The present invention aims to provide a stabilizing circuit for a bandwidth reduction system using three level waveform transmission in which the stabilization circuit overcomes, to a large extent, the difficulties of prior systems by providing a three level waveform having a stabilized mean level. Mean level of the signal is defined as the level which is intermediate between the minimum and maximum levels of the signal.

It is particularly important that the three level waveform have a stabilized mean level as practically all conversion systems for recovering the analogue signal from the three level signal utilize a full wave rectifier which in effect folds the three level signal about its mean level as an axis to restore the original binary signal to provide the video signal for the recorder.

In accordance with the invention a circuit for stabilizing a three level waveform is provided which includes circuit means for providing a waveform representative of variations in the mean level of the three level waveform together with circuit means for inverting and combining the produced waveform with the three level waveform to produce an output waveform which has a stabilized mean level.

The system in accordance with the invention is advantageous in that jitter in the recorded copy from such variations in the transmission medium is prevented.

Other objects and advantages of the invention will be apparent from the following description, and from the accompanying drawings which show, by way of example, an embodiment of the invention.

Figure 1:
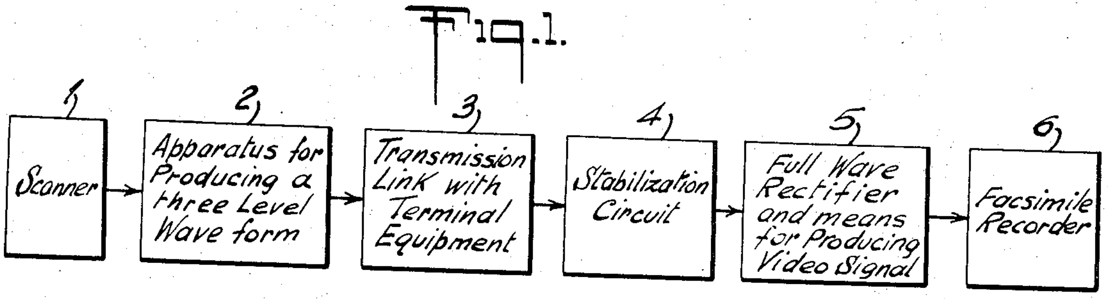
FIG. 1 is a block diagram of a facsimile transmission circuit with bandwidth reduction employing a three level signal in which a stabilization circuit is included in accordance with the invention.

Referring to the drawings there are shown in FIG. 1 blocks representing the parts of a facsimile transmission circuit including a scanner 1, apparatus for producing a three level waveform 2, a transmission link with terminal equipment 3, a stabilization circuit in accordance with the invention 4, a full wave rectifier and circuit means for producing video signal 5, and a facsimile recorder 6. The circuitry of these elements is known in the art and/or is described in the said copending application Ser. No. 765,579. As stated above, the purpose of the stabilization circuit in accordance with the invention is to eliminate jitter which may result from possible shifting of the mean level of the three level waveform in the bandwidth reduction system. An understanding of the jitter may result from a study of FIGS. 3–8.

Figures 3, 4, 5, 6, 7, 8:
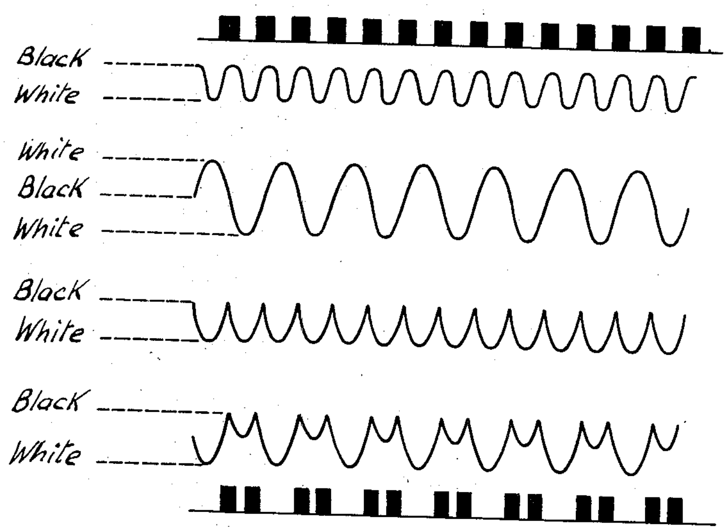
FIG. 3 illustrates alternate black and white bars of equal width representative of copy which might be transmitted from a scanner to a recorder.
FIG. 4 is an output waveform of a facsimile scanner generated as a result of scanning FIG. 3.
FIG. 5 is a three level waveform representative of the copy of FIG. 3 after being transmitted through the transmission lines and received at the input of the stabilization circuit in accordance with the invention.
FIG. 6 is a waveform exhibiting no time-displacement distortion resulting from full wave rectification of the waveform of FIG. 5 in which there has been no variation in the mean level of the three level signal.
FIG. 7 is a waveform corresponding to FIG. 6 but in which the mean level of the three level waveform has been varied during transmission.
FIG. 8 is a recording produced from the time-displacement distorted waveform of FIG. 7 illustrating the recording jitter produced because of a shift in the mean level of the three level waveform.

FIG. 3 shows alternate bars of black and white which may be scanned by the scanner 1 to produce an output waveform as shown in FIG. 4. The bandwidth reduction circuit for producing a three level waveform reduces the frequency of the two level signal shown in FIG. 4 by one-half and provides the three level signal shown in FIG. 5 for transmission over the transmission lines. The three level signal is restored to a two level signal of the original frequency by means of the full wave rectifier 5 as is known in the art. The effect of the full wave rectifier is to fold the waveform according to FIG. 5 along the mean level thereof, thereby providing the waveform of FIG. 6. In the event the transmission link has caused a shift in the mean level of the three level signal the action of the full wave rectifier will produce a waveform such as shown in FIG. 7 wherein the peaks are of unequal amplitude differing from the ideal waveform of FIG. 6 in which the peaks are of equal amplitude.

The recording produced by applying the waveform of FIG. 7 to a facsimile recorder is as shown in FIG. 8 in which it will be noted that the black bars instead of being equally spaced are spaced in pairs with the spacing between adjacent bars of a pair more closely spaced than the distance to the next pair of bars. This effect is termed "jitter."

Figure 2:
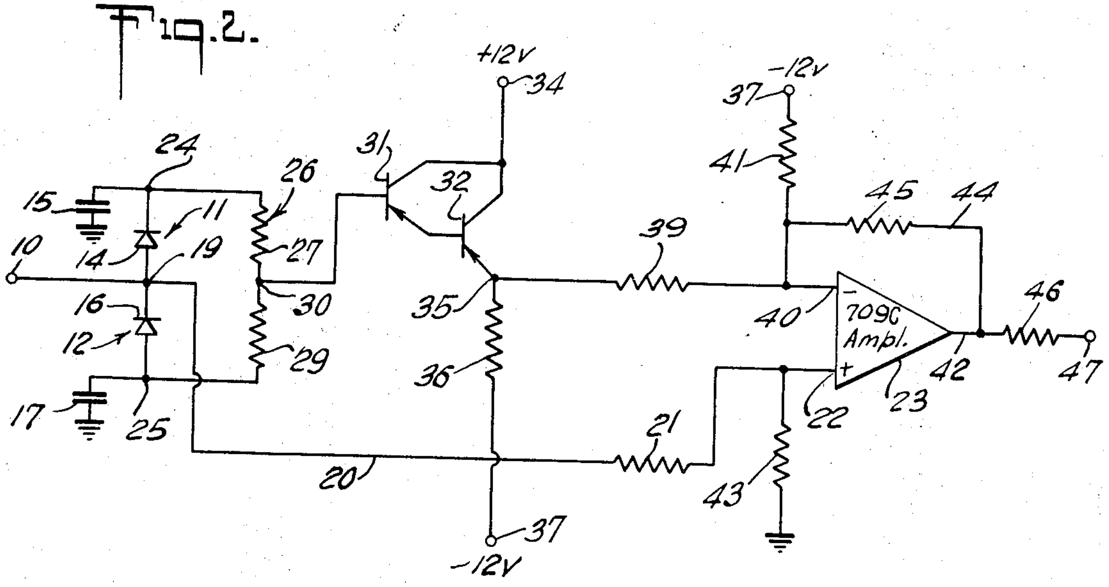
FIG. 2 is a schematic diagram of a stabilization circuit in accordance with the invention.

The stabilization circuit 4 in accordance with the invention is shown in some detail in FIG. 2 and includes means adapted to receive at its input a three level waveform subject to variations of the mean level thereof such as may be transmitted by the transmission link and amplified in the terminal equipment to be received at the input terminal 10. This signal is passed through a pair of peak level detectors 11 and 12 connected in series. The peak level detector 11 includes a diode 14 connected in series with a capacitor 15 to ground. A second peak level detector 12 is connected in series therewith and includes diode 16 connected in series with a capacitor 17 to ground. The junction 19 between the peak level detectors 11 and 12 is connected to the input terminal 10, a lead 20 being connected to the junction 19 to conduct the three level signal through a resistor 21 to non-inverting terminal 22 of an operational amplifier 23.

The operational amplifier 23 while possible made of separate components advantageously may be an integrated circuit of which a suitable type is NA709C type of Fairchild Semiconductor, Mountain View, Calif. This operational amplifier performs an analogue arithmetic operation. This operation effectively consists of the subtraction from the main signal of terminal 10 of the mean varying signal obtained from terminal 30 of voltage divider 26. This means that variations in the mean value of the main input signal are eliminated by the subtraction of the variations in the operational amplifier.

The terminals 24 and 25 of the series connected peak level detectors 11 and 12 are connected across a voltage divider 26 including resistors 27 and 29 having a midpoint output tap 30. It is at this output 30 that there is produced a waveform representative of any mean level variations in the three level waveform. This waveform is transmitted to a pair of Darlington connected transistors 31 and 32, or alternatively a compound connected transistor, receiving collector bias from a plus 12 volt supply 34. The emitter output 35 of the Darlington connected transistors 31 and 32 are connected through a resistor 36 to a minus 12 volt supply 37.

The output 35 is also connected through a resistor 39 to the inverting terminal 40 of the operational amplifier 23. Also connected to the inverting terminal 40 is a resistor 41 supplied from the negative 12 volt power supply 37. The operational amplifier 23 has its non-inverting input 22 connected through a voltage dropping resistor 43 to ground. The output 42 of the operational amplifier is connected by a feedback connection lead 44 through a resistor 45 to the inverting terminal 40. An isolation resistor 46 is connected from the output 42 of the operational amplifier 23 to a terminal 47 which is the output of the stabilization circuit 4 and which is connected to the input of the full wave rectifier circuit of block 5.

In the operation of the stabilizing circuit in accordance with the invention at three level signal such as illustrated in FIG. 5 is applied to the input terminal 10. The peak level detectors 11 and 12 in connection with the voltage divider 26 provide at their terminal 30 a current having a waveform representative of any variations in the mean level of the three level signal applied to the input 10. This waveform is amplified in the Darlington connected transistors 31 and 32 and applied to the inverting terminal 40 of amplifier 23. Simultaneously from the input terminal 10 the three level waveform is passed through the lead 20 and the resistor 21 to the non-inverting terminal 22 of the amplifier 23.

In order to establish the mean level of the output signals appearing at terminal 47 at a desired level bias means to the inverting input terminal 40 is provided by the negative supply through the resistor 41. The output of the operational amplifier 23 is also fed back through the lead 44 to the inverting terminal 40 or summing point in order to set the gain of the operational amplifier at a desired level. The desired gain level of the operational amplifier is that which presents equal, and, opposite, amplifications of the signals appearing at terminals 19 and 35. Thus it will be seen that the waveform produced at the terminal 47 has its mean level stabilized.

The disclosure of Ser. No. 765,579 is incorporated herein by reference in order to reduce the length of the disclosure herein.

The following circuit components were used in an illustrative exemplification of the invention as set out in FIG. 2 and are given by way of example:

Transistors, 31, 32—2N3707.
Diodes 14, 16—1N625.
Capacitors 15, 17—1 mfd.
Resistors 27, 29—510K.
Resistors 36, 39, 45—10K.
Resistor 21—68K.
Resistors 41, 43—56K.
Resistor 46—51 ohms.

While the invention has been described and illustrated with reference to a specific embodiment thereof, it will be understood that other embodiments may resorted to without departing from the invention. Therefore, the form of the invention set out above should be considered as illustrative and not as limiting the scope of the following claims.

We claim:

1. A stabilization circuit comprising a source of a three level waveform subject to variations in the mean level thereof, a pair of peak level detectors each having an input and an output, means connecting the input of one peak level detector to the input of the other peak level detector thereby forming a junction, means connecting said junction directly to the source of the three level waveform, a summing network having a pair of inputs and an output, means connecting the outputs of both peak detectors to the inputs of the summing network, the output of the summing network providing a waveform representative of any variations in the mean level of the three level waveform, means for inverting said last mentioned waveform, and means for combing said inverted waveform with the waveform of said three level source to provide an output waveform with stabilized mean level.

2. A stabilization circuit according to claim 1 in which each of said peak level detectors includes a diode and a capacitor connected in series.

3. A stabilization circuit according to claim 1 in which said means for inverting said waveform includes means associated with one input of an operational amplifier, said means for combining said inverted waveform with said three level waveform is means associated with the other input of said operational amplifier.

4. A stabilization circuit according to claim 1 in which is included bias means to establish the mean level of the output signal at a desired level.

References Cited

UNITED STATES PATENTS

| | | | |
|---|---|---|---|
| 3,213,369 | 10/1965 | McAuliffe | 328—117 X |
| 3,319,178 | 5/1967 | Harmer | 328—117 X |
| 3,372,234 | 3/1968 | Bowsher et al. | 307—235 X |
| 3,398,373 | 8/1968 | Caswell | 307—235 X |

DONALD D. FORRER, Primary Examiner

J. D. FREW, Assistant Examiner

U.S. Cl. X.R.

178—68, 7.1, 7.3; 307—235; 325—38; 328—146, 150, 151

UNITED STATES PATENT OFFICE

CERTIFICATE OF CORRECTION

Patent No. 3,530,385 Dated September 22, 1970

Inventor(s) John W. Smith and Albert H. Libbey

It is certified that error appears in the above-identified patent and that said Letters Patent are hereby corrected as shown below:

Column 3, line 47, change "possible" to --possibly--

Column 4, line 39, remove the comma after "Transistors"

Claim No. 1, line 69, change "combing" to --combining--

SIGNED AND
SEALED
DEC 1 - 1970

(SEAL)
Attest:

Edward M. Fletcher, Jr.
Attesting Officer

WILLIAM E. SCHUYLER, JR.
Commissioner of Patents